United States Patent
Kohnen et al.

[11] Patent Number: 5,842,823
[45] Date of Patent: *Dec. 1, 1998

[54] BALE-ACCUMULATING TRAILER

[75] Inventors: Richard Kohnen, Montreal; Eric St-Denis, St. Joseph du Lac; Patrick Provost, Quebec, all of Canada

[73] Assignee: Gehl Company, West Bend, Wis.

[*] Notice: This patent issued on a continued prosecution application filed under 37 CFR 1.53(d), and is subject to the twenty year patent term provisions of 35 U.S.C. 154(a)(2).

[21] Appl. No.: 970,814

[22] Filed: Nov. 14, 1997

Related U.S. Application Data

[63] Continuation of Ser. No. 864,179, May 28, 1997, abandoned, which is a continuation of Ser. No. 571,619, Dec. 13, 1995, abandoned.

[51] Int. Cl.$^6$ .................................................. B60P 01/16
[52] U.S. Cl. ...................... 414/111; 298/22 C; 414/477; 414/812
[58] Field of Search ................ 100/188 BT, 188 R; 280/446.1; 298/22 C; 414/24.5, 24.6, 111, 477, 786, 812

[56] References Cited

U.S. PATENT DOCUMENTS

| | | |
|---|---|---|
| 2,672,808 | 3/1954 | Eldert . |
| 4,215,964 | 8/1980 | Schrag et al. ............................ 414/111 |
| 4,255,985 | 3/1981 | Schrag et al. ............................ 74/479 |
| 4,310,275 | 1/1982 | Hoelscher ................................ 414/111 |
| 4,573,845 | 3/1986 | Carpenter ................................ 414/24.5 |
| 4,710,086 | 12/1987 | Naaktgeboren et al. ............ 414/111 X |
| 4,710,087 | 12/1987 | Naaktgeboren et al. ............ 414/111 X |
| 4,844,675 | 7/1989 | Strosser et al. ......................... 414/111 |
| 4,938,646 | 7/1990 | Elias et al. ........................... 414/111 X |
| 4,952,111 | 8/1990 | Callahan ................................. 414/111 |
| 5,046,918 | 9/1991 | Berlivet et al. ...................... 414/789.7 |
| 5,193,882 | 3/1993 | Gamaldi ............................. 414/917 X |
| 5,501,562 | 3/1996 | Zimmerman ....................... 414/24.5 X |
| 5,511,921 | 4/1996 | Meijer ................................... 414/24.5 |

*Primary Examiner*—Janice L. Krizek
*Attorney, Agent, or Firm*—Andrus, Sceales, Starke & Sawall

[57] ABSTRACT

A bale-accumulating trailer is connectable to a baler for forming round bales of agricultural crop material. The trailer includes a fixed frame having a set of ground-engaging wheels, and a dumping frame pivotably mounted to the fixed frame for movement between a bale accumulating position and a bale dumping position in response to operation of a dumping cylinder assembly. A bale transfer mechanism functions to receive bales discharged from the baler and to place the formed bales onto the dumping frame. The bale transfer mechanism includes a carriage movable between a forward position and a rearward position in response to operation of a cylinder assembly. A bale receiver is mounted to the carriage, and is movable between a bale receiving position and an upright position in response to operation of a pair of cylinder assemblies. The bale receiver is positioned adjacent and below the discharge of the baler when the carriage is in its forward position, so that a bale from the baler is deposited on the bale receiver upon discharge from the baler. The formed bale is placed onto the dumping frame upon rearward movement of the carriage to a rearward position and movement of the bale receiver to an upright position. Bales carried by the dumping frame can then be deposited onto the ground by tilting the dumping frame relative to the fixed frame and moving the trailer forwardly.

23 Claims, 4 Drawing Sheets

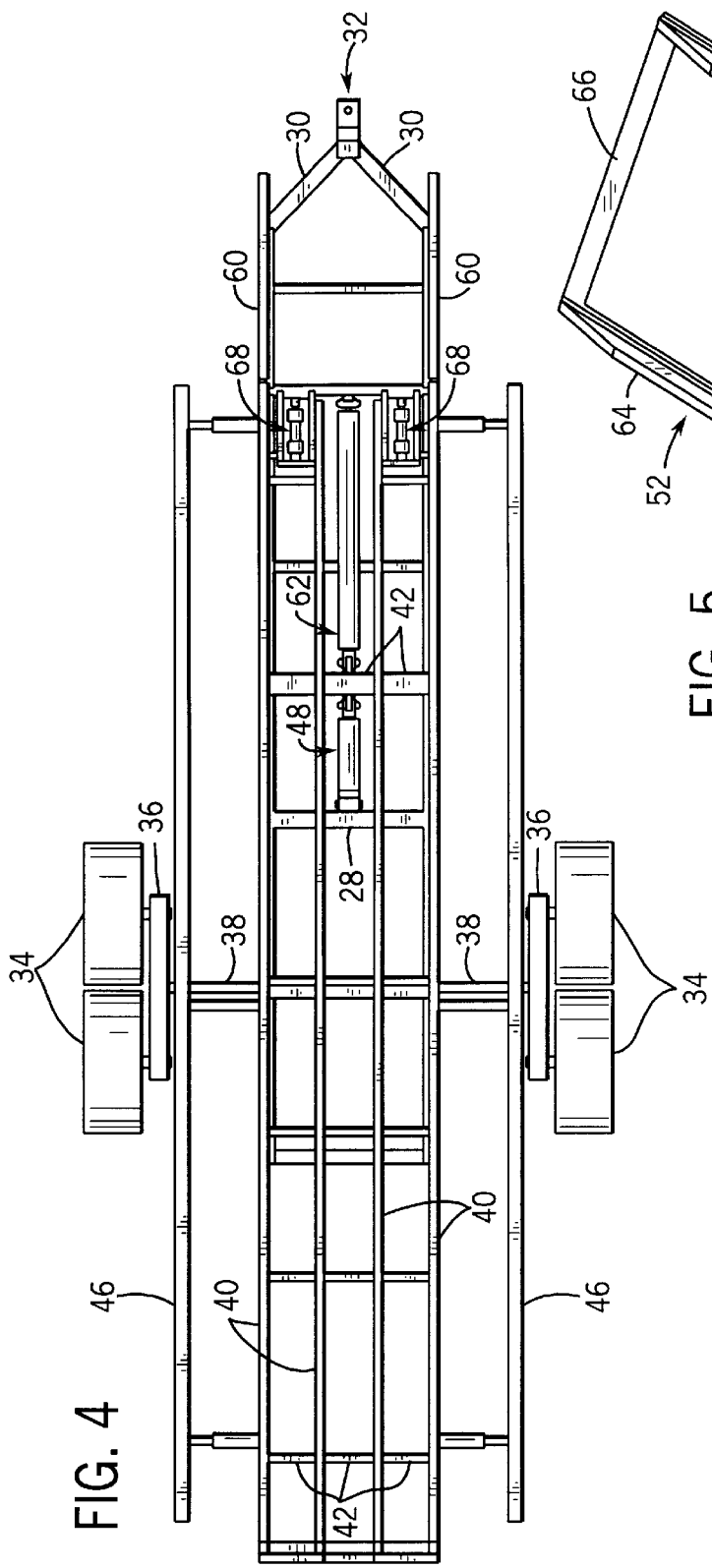
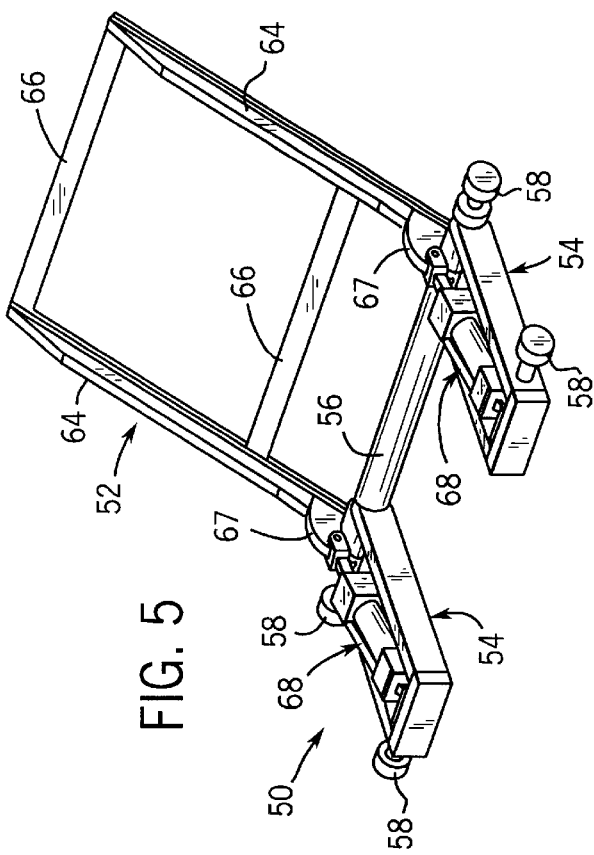

BALE-ACCUMULATING TRAILER

CROSS-REFERENCE TO RELATED APPLICATION

This application is a continuation of application Ser. No. 08/864,179, filed May 28, 1997, now abandoned, which is a continuation of application Ser. No. 08/571,619, filed Dec. 13, 1995, now abandoned.

BACKGROUND AND SUMMARY OF THE INVENTION

This invention relates to a device for receiving and accumulating bales of crop material as the bales are discharged from a baler, and more particularly to a trailer-type device which is towed behind the baler.

Round balers are commonly used to form cylindrical or round bales of agricultural crop material such as hay. Most round bales are discharged from the baler directly onto the ground, and are too heavy to be handled manually. This requires the operator to undertake a separate operation to collect the bales from the field and move the bales to a storage location. Many devices are known for collecting bales from a field. However, this approach requires the operator to go through the field a second time, resulting in a loss of time and unnecessary and undesirable field compaction.

It is an object of the present invention to provide a bale-accumulating trailer for towing behind a baler to collect and transport a number of bales after they are discharged from the baler. It is a further object of the invention to provide such a device which is also capable of depositing the collected bales onto the ground when desired. Yet another object of the invention is to provide a bale collecting device which is relatively simple in its construction and operation, yet which provides reliability in operation and can accommodate various types of round balers.

In accordance with the invention, a trailer-type bale accumulator for use in combination with a baler includes a first, fixed frame connectable to the baler and a dumping frame pivotably mounted to the first frame for movement between a bale accumulating position and a bale dumping position. A bale transfer mechanism is movably mounted to the accumulator for receiving a formed bale from the discharge of the baler and for moving the bale onto the dumping frame. The accumulator further includes an operating device for moving the dumping frame between its bale accumulating and bale dumping positions. The fixed frame includes a set of ground-engaging wheels and a hitch-type connector at its forward end for mounting to the baler, to enable the accumulator to be towed behind the baler. The dumping frame includes stop structure toward its rearward end so as to prevent bales from moving off of the dumping frame when the dumping frame is in its bale accumulating position. The bale transfer mechanism includes a carriage movable between a forward bale receiving position for receiving a bale upon discharge from the baler, and a rearward transfer position in which the carriage functions to place the bale onto the dumping frame. The bale transfer mechanism further includes a bale receiver which receives a bale from the discharge of the baler when the carriage is in its bale receiving position, and which is also operable to push the bale onto the dumping frame. The bale receiver is pivotally mounted to the carriage for movement between a receiving position in which the bale receiver is positioned adjacent the baler discharge and an upright position which moves the bale rearwardly by rearward pivoting movement to an upright position. An actuator is interposed between the carriage and the bale receiver for moving the bale receiver between its receiving position and its upright position. In a preferred form, the carriage includes a pair of side members and a cross-member extending therebetween, and the bale receiver is pivotably mounted to the cross-member. Each side member is preferably in the form of a frame subassembly, and the bale receiver actuator consists of a pair of extendable and retractable cylinder assemblies mounted one to each frame subassembly. The bale receiver preferably includes a pair of mounting lugs, each of which is interconnected with one of the extendable and retractable cylinder assemblies. The mounting lugs are offset from the pivot axis of the bale receiver so as to cause the bale receiver to move between its receiving and upright positions upon operation of the extendible and retractable cylinder assemblies. The carriage defines a pair of spaced sides, and the carriage sides are movably supported in a pair of spaced rail members located on spaced sides of the bale accumulator. Each rail member consists of a forward rail section mounted to the fixed frame and rear track or channel structure associated with a pair of spaced beam members associated with the dumping frame. Each forward rail section supports the carriage when it is moved to its bale receiving position, and the track or channel structure supports the carriage when it is moved to its transfer position, such that the carriage is supported by the dumping frame beam members when the dumping frame is moved to its bale dumping position. The fixed frame includes a forward end portion located adjacent the baler discharge for supporting the bale transfer mechanism when it receives a formed bale from the discharge of the baler, and a forward end defined by the dumping frame is located rearwardly of the forward end portion of the fixed frame. The dumping frame includes a rear end portion which extends rearwardly of a rearward end defined by the fixed frame, to support the bales when the dumping frame is moved to its dumping position as the bales are slid rearwardly on the dumping frame.

The invention also contemplates a method of handling formed bales subsequent to discharge of the bales from a baler, substantially in accordance with the foregoing summary.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 4 is a top plan view of the bale-accumulating trailer of FIG. 1;

FIG. 5 is an isometric view showing the bale transfer mechanism which forms a part of the bale-accumulating trailer of FIG. 1;

DETAILED DESCRIPTION OF THE INVENTION

Figure 1:
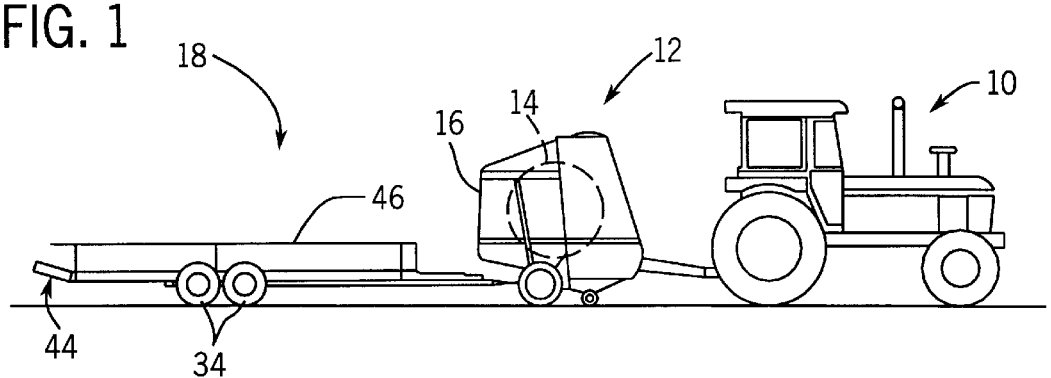
FIG. 1 is a side elevation view showing a tractor towing a round baler and a bale-accumulating trailer constructed according to the invention.

FIG. 1 illustrates a tractor 10 towing a conventional round baler 12 used to form large, cylindrical bales of crop material, shown at 14. Baler 12 includes a tailgate section 16 which is movable between a closed position and an open position. In FIG. 1, tailgate 16 is shown in its closed position for cooperating with the remaining components of baler 12 to form bale 14. When tailgate 16 is moved to its open position, bale 14 is discharged from the interior of baler 12 in a downward and rearward direction. In accordance with the invention, a bale-accumulating trailer 18 is towed behind baler 12 for accumulating and transporting bales 14 after they are discharged from baler 12.

Figure 2:
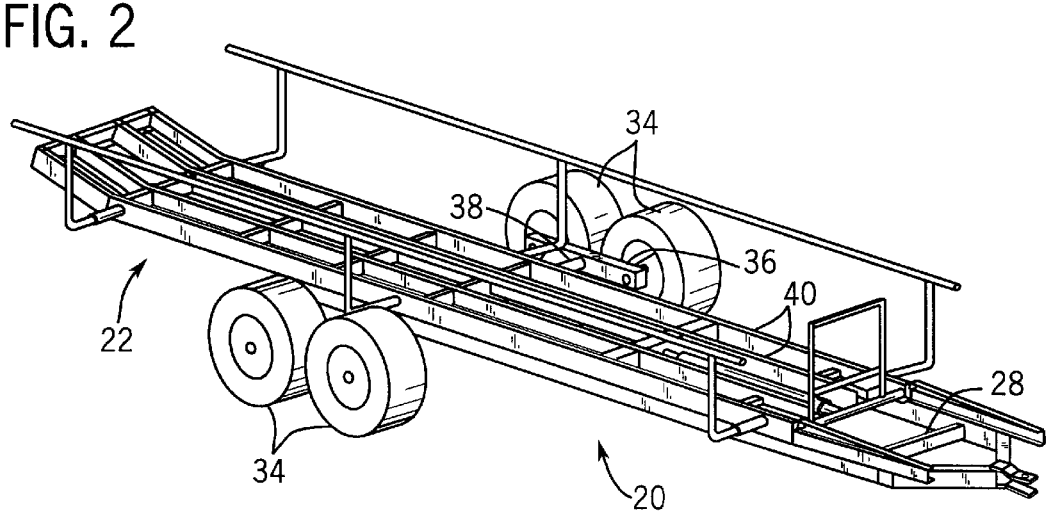
FIG. 2 is an isometric view showing the bale-accumulating trailer of FIG. 1.
Figure 3:
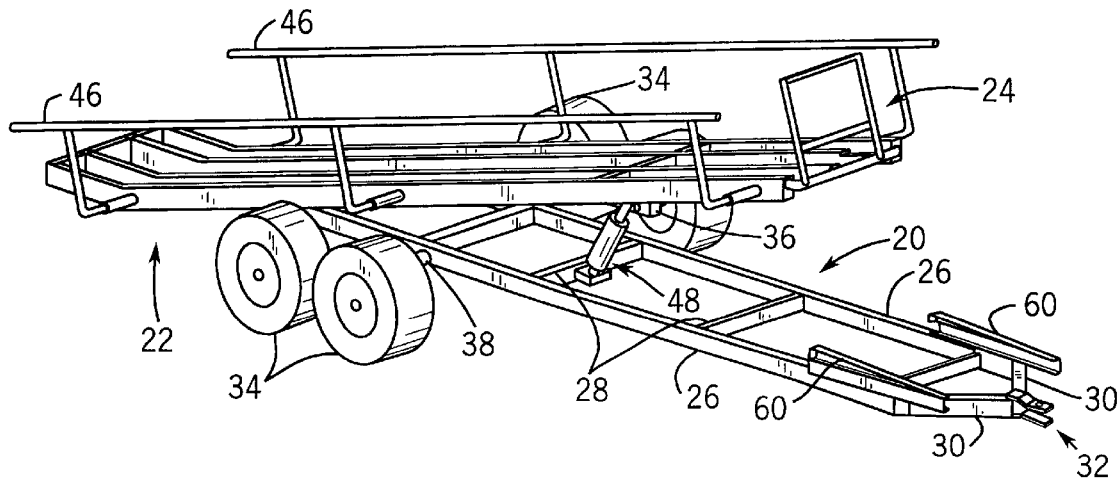
FIG. 3 is an isometric view showing the bale-accumulating trailer of FIGS. 1 and 2 with its dumping frame moved to a dumping position for placing accumulated bales onto the ground.

Referring to FIGS. 2 and 3, trailer 18 generally includes a fixed frame 20, a dumping frame 22, and a bale transfer mechanism 24.

Fixed frame 20 includes a pair of spaced, longitudinally-extending side frame members 26 and a series of cross-members 28. A pair of angled front end members 30 extend from the forward ends of side frame members 26, defining a forwardly-pointing apex where front end members 30 are connected together. A conventional trailer hitch 32 is mounted to the apex defined by front end members 30.

A pair of ground-engaging wheels 34 are located one on either side of trailer 18. Each pair of wheels 34 is mounted to an oscillating beam 36, which in turn is mounted to an axle 38. Axle 38 is mounted to fixed frame 20 in a conventional manner.

Referring to FIGS. 2–4, dumping frame 22 is made up of a series of longitudinally-extending beam members 40 interconnected by cross-members 42. Dumping frame 22 is pivotably mounted to the rear of fixed frame 20, so as to be movable between a dumping position as shown in FIG. 3 and a bale-accumulating or collecting position as shown in FIG. 2. In its bale accumulating position, dumping frame 22 overlies fixed frame 20. Dumping frame 22 defines a forward end which is located rearwardly of the front end of fixed frame 20. A rear end portion of dumping frame 22 extends past the rear end of fixed frame 20, and the rear of dumping frame 22 defines an upwardly angled stop portion 44. A pair of side rails 46 are mounted to the outer beam members 40 of dumping frame 22.

As shown in FIGS. 3 and 4, a dumping actuator cylinder assembly 48 is interconnected between fixed frame 20 and dumping frame 22. The cylinder end of cylinder assembly 48 is pivotably mounted to one of fixed frame cross-members 28, and the rod end of cylinder assembly 48 is pivotably mounted to one of dumping frame cross-members 42. Cylinder assembly 48 is operable to move dumping frame 22 to its dumping position of FIG. 3 upon extension of its rod, and to return dumping frame 22 to its bale accumulating position of FIG. 2 upon retraction of its rod. When the rod of cylinder assembly 48 is extended to place dumping frame 22 in its dumping position, dumping frame 22 is positioned at approximately a 15 ° angle relative to fixed frame 20.

Figure 6:
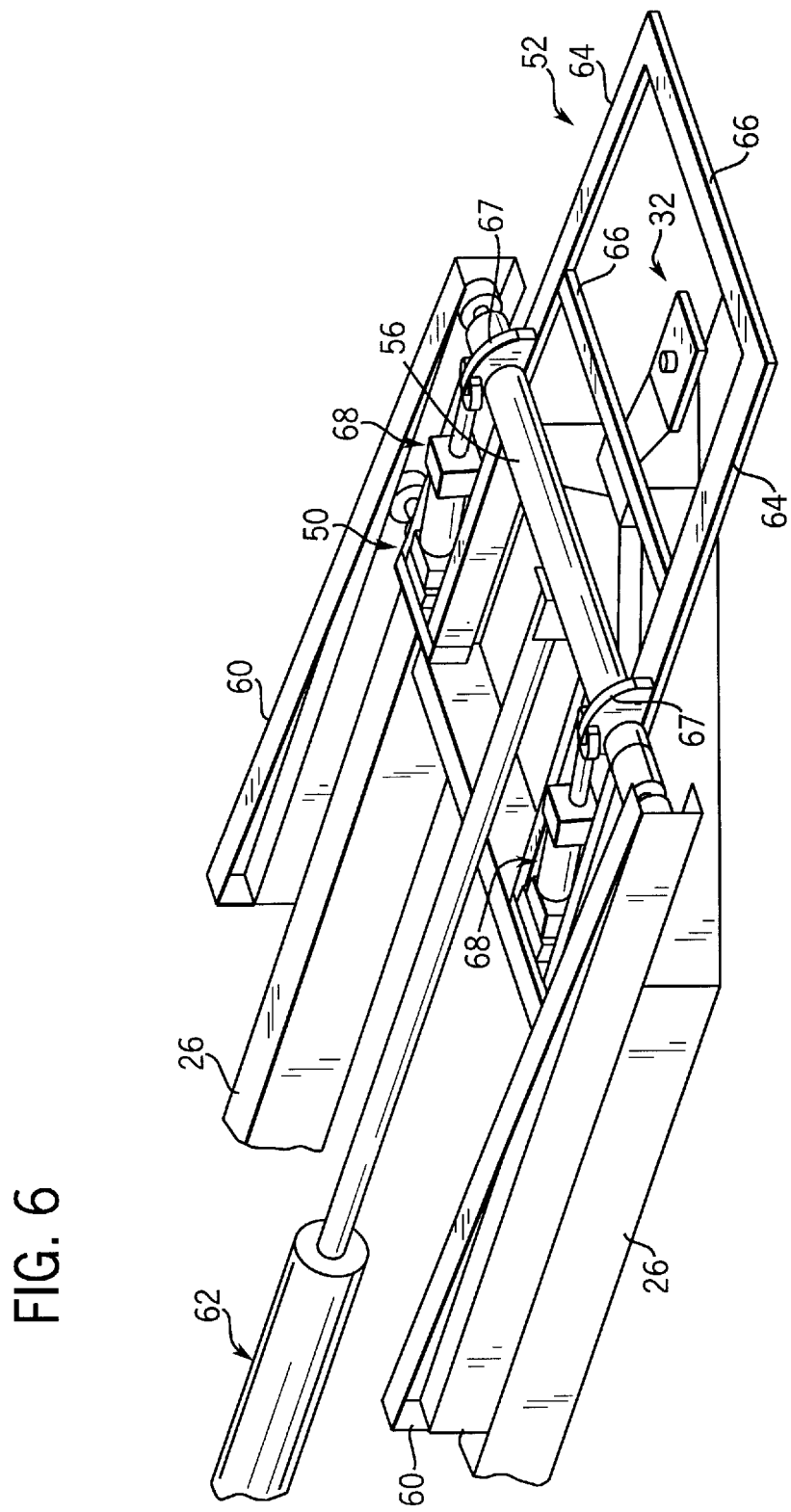
FIG. 6 is a partial isometric view showing the bale transfer mechanism in a position for receiving a formed bale from the discharge of the round baler.

Referring to FIGS. 3, 5 and 6, bale transfer mechanism 24 includes a carriage assembly 50 and a bale receiver 52. Carriage 50 includes a pair of side frame subassemblies 54 interconnected at their forward ends via a cross-shaft 56. Wheels or rollers 58 are mounted to side frame subassemblies 54 so as to extend outwardly therefrom. The forward ends of the outer beam members 40 of dumping frame 22 are provided with channels or track structure within which wheels 58 are received. As shown in FIG. 3, a pair of rail sections 60 are mounted to fixed frame 20 forwardly of the front end of dumping frame 22, and each of rail sections 60 defines a channel which is aligned with the channel or track structure formed in the front end portions of outer beam members 40. In this manner, rail sections 60 are capable of receiving wheels 58 for supporting carriage 50.

As shown in FIGS. 4 and 6, a carriage actuator cylinder assembly 62 has its rod end pivotably secured to carriage cross-shaft 56, and has its cylinder end pivotably secured to one of dumping frame cross-members 42. Extension of the rod of carriage actuator cylinder assembly 62 functions to move carriage 50 forwardly such that its wheels 58 are supported by fixed frame rail sections 60. Retraction of the rod of carriage actuator cylinder assembly 62 functions to move carriage 50 to a rearward position in which it is supported by the track or channel structure associated with the forward end portions of outer beam members 40.

Referring to FIGS. 5 and 6, bale receiver 52 includes a pair of longitudinally-extending rails 64 and a pair of cross-members 66. Rails 64 are pivotably mounted to carriage cross-shaft 56, or to any other portion of carriage 50, in a conventional manner. Each rail 64 includes a lug 67 located adjacent its pivotable connection to cross-shaft 56.

As shown in FIGS. 5 and 6, a bale receiver actuator cylinder assembly 68 is interconnected between each lug 67 and each carriage side frame subassembly 54, such that the cylinder end of each cylinder assembly 68 is pivotably mounted to a rear member of frame subassembly 54 and the rod end of each cylinder assembly 68 is pivotably mounted to one of lugs 67. With this arrangement, operation of bale receiver actuator cylinder assemblies 68 functions to move bale receiver 52 from a bale-receiving position as shown in FIG. 6 and a bale transfer position as shown in FIG. 3. FIG. 5 illustrates bale receiver 54 between its bale receiving and bale transfer positions. In its bale receiving position of FIG. 6, bale receiver 52 is substantially coplanar with a plane defined by dumping frame 22. In its bale transfer position of FIG. 3, bale receiver 52 is positioned substantially perpendicularly to dumping frame 22.

In operation, bale-accumulating trailer 18 functions as follows. When baler 12 has formed a completed bale 14, bale receiver actuator cylinder assemblies 68 are first extended so as to move bale receiver 52 to its bale receiving position of FIG. 6. Carriage actuator cylinder assembly 62 is then extended so as to move carriage 50 and bale receiver 52 forwardly such that carriage 50 is supported by rail sections 60, to position bale receiver 52 adjacent and under the discharge area of baler 12. The discharge sequence of baler 12 is then actuated so as to raise tailgate 16 of baler 12 to discharge the formed bale 14 therefrom, which functions to deposit bale 14 onto bale receiver 52. The above sequence of steps is then reversed, such that bale receiver actuator assemblies 68 are retracted to move bale receiver 52 to its upright position. Carriage actuator cylinder assembly 62 is then retracted to draw carriage 50 rearwardly to disengage carriage 50 from fixed frame rail sections 60, and to move bale receiver 52 to its bale transfer position of FIG. 2. This series of steps functions to move the formed bale 14 onto the forward end portion of dumping frame 22, such that bale 14 is supported by beam members 40. These steps are then repeated for successive bales 14 formed by baler 12, such that each time a bale 14 is deposited onto the forward portion of dumping frame 22, the prior bale is pushed rearwardly on dumping frame beam members 40. Angled stop portion 44 of dumping frame 22 prevents bales from rolling rearwardly off dumping frame 22, and side rails 46 prevent bales 14 from falling sideways off dumping frame 22. Once trailer 18 is full or the operator has gathered a desired number of bales, dumping frame actuator cylinder assembly 48 is extended so as to move dumping frame 22 to its dumping position of FIG. 3. In this position, the bales slide off of dumping frame 22 onto the ground, as the operator moves tractor 10, baler 12 and trailer 18 forwardly. The angle between dumping frame 22 and fixed frame 20 must be such that the weight of each bale 14 exerts a sufficient downward force to overcome the frictional forces between bale 14 and the upper surfaces of beams 40, to cause bales 14 to slide rearwardly when dumping frame 22 is in its dumping position of FIG. 3. It is believed that an angle of approximately 15° is sufficient to cause such rearward sliding movement of bales 14. Alternatively, the operator can unhook trailer 18 from baler 12, and trailer 18 can be left in the field while loaded with bales. A jack stand or the like (not shown) is used to support the front end of trailer 18. A different tow vehicle, such as another tractor, can then be connected to trailer 18 to return the formed bales to a desired location, such as a storage facility, and another trailer 18 can be hooked to baler 12 so that the baling operation can continue. This results in a highly efficient baling operation. It should be appreciated that trailer 18 can be operated as described to deposit the formed bales when trailer 18 is either partially or completely filled with bales, at any desired location on the field. The bales can then be subsequently picked up and transported by any other satisfactory method, to a desired storage location. Dumping frame 22 can be moved to its dumping position at any time by the operator, so that whatever bales are then being carried by dumping frame 22 can be deposited at any desired location, such as at one end of a field. Again, this provides capabilities for a more efficient collection and transport of bales from the field.

Figure 7:
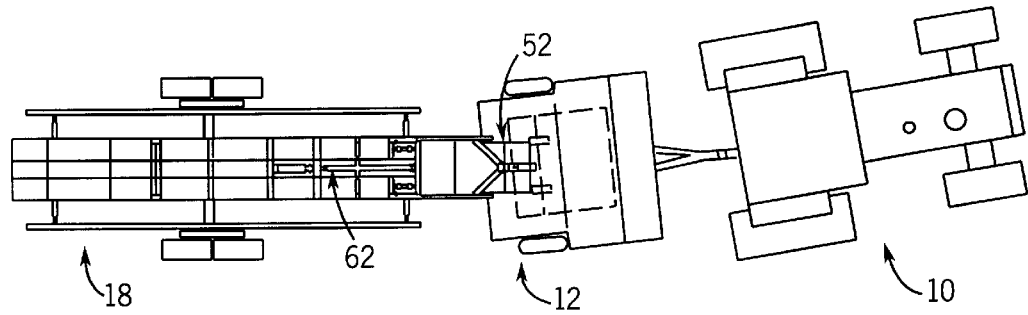
FIG. 7 is a top plan view showing the tractor, baler and trailer combination of FIG. 1 showing the permissible angular relationship between the baler and the trailer when the bale transfer mechanism is in its bale receiving position.

FIG. 7 shows the limitations imposed by trailer 18 in the permissible angle between baler 12 and trailer 18 when carriage 50 is in its forward position and bale receiver 52 is in its bale receiving position. As shown, only approximately a 5° angle between the longitudinal axes of baler 12 and trailer 18 can be accommodated in order to successfully deposit a formed bale 14 onto trailer 18 without interference of bale receiver 52 with the components of baler 12. To prevent operation of trailer 18 when the angle between trailer 18 and baler 12 exceeds this permissible threshold, a sensing and disabling system explained hereafter, is interposed between baler 12 and trailer 18.

Figure 8:
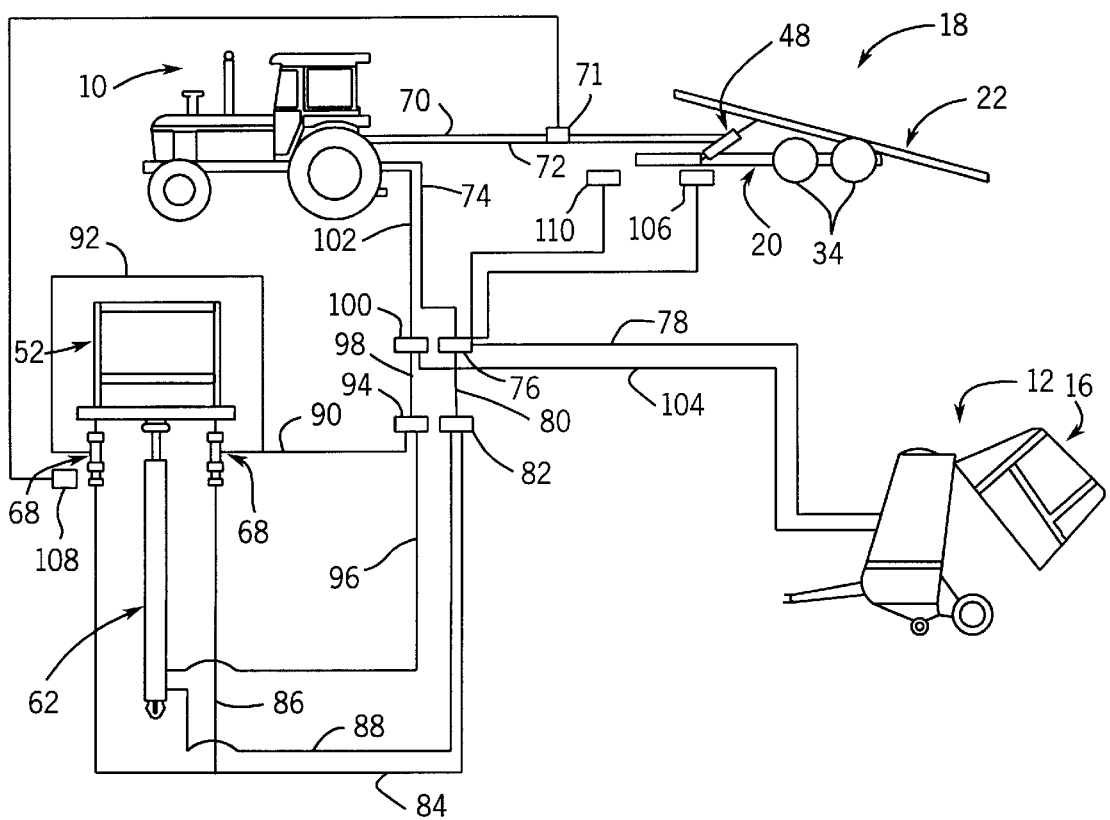
FIG. 8 is a schematic view showing a hydraulic system for operating the actuator components of the bale-accumulator trailer of FIG. 1.

FIG. 8 schematically illustrates a hydraulic system and a sensor system for controlling operation of trailer 18. As shown in FIG. 8, a conventional tractor 10 includes only a pair of hydraulic fluid outlets. One of the tractor hydraulic fluid outlets is interconnected with the inlet and outlet of dumping frame actuator cylinder assembly 48 via a pair of lines 70 and 72, respectively. Line 70 includes a solenoid operated valve 71. The other tractor outlet has a line 74 interconnected with a solenoid operated priority valve 76, which is interconnected with the inlet of tailgate operating system of baler 12 via a line 78. A line 80 extends between valve 76 and a priority valve 82, which supplies fluid to the inlets of bale receiver actuator cylinder assemblies 68 via lines 84, 86 and to the inlet of carriage actuator cylinder assembly 62 via a line 88. Return lines 90 and 92 interconnect the outlets of bale receiver actuator cylinder assemblies 68 with a priority valve 94, and the outlet of carriage actuator cylinder assembly 62 is connected with valve 94 via a line 96. A line 98 connects valve 94 with a solenoid operated priority valve 100, which in turn is interconnected with the reservoir of tractor 10 via a line 102. The hydraulic actuator system of baler 12 is interconnected with valve 100 via a line 104.

Valves 76, 82, and 94, 100 are priority valves, which function to operate the components of trailer 18 and tailgate 16 of baler 12 in a predetermined sequence. When the operator wishes to discharge a bale from baler 12 for transfer to trailer 18, the operator places the hydraulic system of tractor 10 in a position so as to provide fluid pressure to valve 76 via line 74 and line 102 is opened to reservoir. Valve 76 functions to first supply fluid pressure to valve 82. Valve 82 in turn first supplies fluid pressure to lines 84 and 86, to operate bale receiver actuator cylinder assemblies 68 so as to extend cylinder assemblies 68 and to place bale receiver 52 in its bale receiving position of FIG. 6. Once cylinders 68 are fully extended, valve 82 supplies fluid pressure via line 88 to carriage actuator cylinder assembly 62, to extend cylinder assembly 62 and to move carriage 50 and bale receiver 52 forwardly adjacent the discharge of baler 12. Thereafter, valve 76 operates to supply fluid through line 78 to baler 12, to raise tailgate 16 of baler 12 to deposit the formed bale onto bale receiver 52. Once the bale has been discharged from baler 12, the operator reverses fluid flow so as to pressurize line 102 and open line 74 to reservoir. Fluid pressure is first supplied through line 98 to valve 94, which first supplies fluid pressure to lines 90 and 92, to retract bale receiver actuator cylinder assemblies 68 to move bale receiver 52 to its upright position. After cylinder assemblies 68 are fully retracted, valve 94 then supplies fluid pressure to line 96 to retract carriage actuator cylinder assembly 62 and to move carriage 50 rearwardly. Once the desired number of bales have been deposited on dumping frame 22, the operator actuates dumping cylinder assembly 48 to raise dumping frame 22 and to dump the formed bales therefrom, and thereafter reverses the flow of fluid so as to retract dumping frame actuator cylinder assembly 48 to return dumping frame 22 to its bale accumulating position.

A dumping frame sensor 106 is mounted to fixed frame 20 for detecting the position of dumping frame actuator cylinder assembly 48. If sensor 106 detects that cylinder assembly 48 is moved away from the position it assumes when dumping frame 22 is in its bale accumulating position of FIG. 2, sensor 106 sends a signal to solenoid valve 76 so as to prevent fluid flow there-through which otherwise could cause extension of carriage actuator cylinder assembly 62. This prevents forward movement of carriage 50 onto rails 60 unless dumping frame 22 is in its lowered, bale accumulating position. A sensor 108 detects whether carriage 50 is moved away from its fully retracted, rearward position in which it is solely supported by dumping frame 22. If carriage 50 is not in its fully rearward position, sensor 108 sends a signal to valve 71 so as to prevent fluid flow through line 70 which otherwise could cause extension of dumping frame actuator cylinder assembly 48. This prevents operation of cylinder assembly 48 unless carriage 50 is in its fully retracted position. A sensor 110 is mounted to trailer hitch 32 to detect the angle of trailer 18 relative to baler 12. If the angle of trailer 18 relative to baler 12 exceeds a predetermined threshold, e.g. 5°, sensor 110 sends a signal to valve 76 to close valve 76 and to prevent lifting of baler tailgate 16 and to prevent operation of cylinder assemblies 62 and 68 until the angle between trailer 18 and baler 12 falls below the predetermined threshold.

Various alternatives and embodiments are contemplated as being within the scope of the following claims particularly pointing out and distinctly claiming the subject matter regarded as the invention.

We claim:

1. A bale accumulator for use in combination with a baler having a discharge, comprising:

a first frame connectable to the baler and extending along a longitudinal axis between a forward end and a rearward end;

a dumping frame pivotably mounted to the first frame about a pivot axis substantially transverse to the longitudinal axis of the first frame, wherein the dumping frame is pivotable between a bale accumulating position and a bale dumping position;

a bale transfer mechanism movably mounted to the accumulator for movement between a forward bale receiving position and a rearward bale transfer position, wherein the bale transfer mechanism in its bale receiving position receives a formed bale from the discharge of the baler and wherein movement of the bale transfer mechanism to its bale transfer position moves the bale onto the dumping frame; and an operating device for moving the dumping frame between its bale accumulating and bale dumping positions.

2. The bale accumulator of claim 1, wherein the first frame includes a set of ground-engaging wheels.

3. The bale accumulator of claim 1, wherein the first frame includes a connector at a forward end thereof for mounting to the baler.

4. A bale accumulator for use in combination with a baler having a discharge, comprising:

a first frame connectable to the baler, wherein the first frame includes a connector at a forward end thereof for mounting to the baler;

a dumping frame pivotably mounted to the first frame for movement between a bale accumulating position and a bale dumping position;

a bale transfer mechanism movably mounted to the accumulator for receiving a formed bale from the discharge of the baler and for moving the bale onto the dumping frame;

an operating device for moving the dumping frame between its bale accumulating and bale dumping positions; and an arrangement interconnected with the connector for preventing operation of the bale accumulator if the angle between the baler and the bale accumulator exceeds a predetermined threshold.

5. A bale accumulator for use in combination with a baler having a discharge, comprising:

a first frame connectable to the baler;

a dumping frame pivotably mounted to the first frame for movement between a bale accumulating position and a bale dumping position, wherein the dumping frame includes a stop portion located toward a rearward end thereof for preventing bales from moving off the dumping frame when the dumping frame is in its bale accumulating position;

a bale transfer mechanism movably mounted to the accumulator for receiving a formed bale from the discharge of the baler and for moving the bale onto the dumping frame; and an operating device for moving the dumping frame between its bale accumulating and bale dumping positions.

6. A bale accumulator for use in combination with a baler having a discharge, comprising:

a first frame connectable to the baler;

a dumping frame pivotably mounted to the first frame for movement between a bale accumulating position and a bale dumping position;

a bale transfer mechanism movably mounted to the accumulator for receiving a formed bale from the discharge of the baler and for moving the bale onto the dumping frame, wherein the bale transfer mechanism includes a carriage and a bale receiver movable between a forward bale receiving position for receiving a bale upon discharge from the baler, and a rearward transfer position in which the carriage functions to place the bale onto the dumping frame; and an operating device for moving the dumping frame between its bale accumulating and bale dumping positions.

7. The bale accumulator of claim 6, wherein the bale receiver receives the bale when the carriage and bale receiver are in the bale receiving position, and wherein the bale receiver is operable to push the bale onto the dumping frame when the carriage and bale receiver are in the transfer position.

8. The bale accumulator of claim 7, wherein the bale receiver is pivotably mounted to the carriage for movement about a pivot axis between a receiving position in which the receiver is positioned adjacent the baler discharge and an upright position for moving the bale onto the dumping frame, and further comprising a bale receiver actuator interposed between the carriage and the bale receiver for moving the bale receiver between its receiving position and its upright position.

9. The bale accumulator of claim 8, wherein the carriage includes a pair of side members and a cross-member extending between the side members, and wherein the bale receiver is mounted to the cross-member.

10. The bale accumulator of claim 9, wherein each side member comprises a frame subassembly, and wherein the bale receiver actuator comprises a pair of extendable and retractable cylinder assemblies mounted one to each frame subassembly.

11. The bale accumulator of claim 10, wherein the bale receiver includes a pair of mounting lugs, wherein each mounting lug is interconnected with one of the extendable and retractable cylinder assemblies, and wherein the mounting lugs are offset from the pivot axis of the bale receiver so as to move the bale receiver between its receiving and upright positions upon operation of the extendable and retractable cylinder assemblies.

12. The bale accumulator of claim 6, wherein the carriage includes a pair of spaced sides, wherein the carriage sides are movably supported in rail members located on spaced sides of the bale accumulator.

13. The bale accumulator of claim 12, wherein each rail member comprises a forward rail section mounted to the first frame and rear channel structure associated with the dumping frame.

14. The bale accumulator of claim 13, wherein the forward rail sections support the carriage when it is moved to its bale receiving position, and wherein the rear channel structure supports the carriage when it is moved to its transfer position, and wherein the carriage is supported by the rear channel structure when the dumping frame is moved to its bale dumping position.

15. A bale accumulator for use in combination with a baler having a discharge, comprising:

a first frame connectable to the baler;

a dumping frame pivotably mounted to the first frame for movement between a bale accumulating position and a bale dumping position;

a bale transfer mechanism movably mounted to the accumulator for receiving a formed bale from the discharge of the baler and for moving the bale onto the dumping frame; and an operating device for moving the dumping frame between its bale accumulating and bale dumping positions;

wherein the first frame includes a forward end portion located adjacent the baler discharge for supporting the bale transfer mechanism when receiving a formed bale from the discharge of the baler, wherein a forward end of the dumping frame is located rearwardly of the first frame forward end portion, and wherein the dumping frame includes a rear end portion which extends rearwardly of a rearward end of the first frame for supporting the bales when the dumping frame is moved to its dumping position as the bales are moved rearwardly on the dumping frame.

16. A bale accumulator for use in combination with a baler having a discharge for accumulating bales discharged from the baler, comprising:

a fixed frame having a set of ground-engaging wheels mounted thereto;

a dumping frame pivotably mounted to the fixed frame and being constructed so as to support a plurality of bales;

a dumping frame actuator interposed between the fixed frame and the dumping frame for moving the dumping frame between a loading position and a tilted dumping position;

a bale transfer mechanism for receiving bales discharged from the baler and moving the bales back to the dumping frame, including a carriage; a carriage actuator for moving the carriage between a forward position and a rearward position; a bale receiver pivotably mounted to the carriage for movement about a pivot axis between a bale receiving position in which the bale receiver is positioned so as to receive a bale from the discharge of the baler, and an upright position; and a bale receiver actuator for moving the bale receiver from its bale receiving position to its upright position; wherein movement of the bale receiver to its upright position and movement of the carriage to its rearward position functions to move a bale from the discharge of the baler onto the dumping frame.

17. The bale accumulator of claim 16, wherein the bale receiver actuator comprises one or more extendable and retractable cylinder assemblies interposed between the carriage and the bale receiver, wherein the bale receiver includes lug structure offset from the pivot axis of the bale receiver to which the one or more extendable and retractable cylinder assemblies are secured for providing pivoting movement of the bale receiver upon operation of the one or more cylinder assemblies.

18. The bale accumulator of claim 16, wherein the carriage includes a pair of spaced side members and a crossmember extending therebetween, wherein the bale receiver is mounted to the cross-member and wherein each of the side members includes a pair of wheels movably mounted to channel structure associated with the bale accumulator for providing movement of the carriage between its forward and rearward positions.

19. The bale accumulator of claim 18, wherein the channel structure includes a forward rail section secured to the fixed frame for supporting the carriage in its forward position, and rear channel structure associated with the dumping frame for supporting the carriage in its rearward position, wherein the forward rail sections and the rear channel structure are in alignment with each other when the dumping frame is in its loading position.

20. A method of handling formed bales subsequent to discharge from a baler, comprising the steps of:

attaching a fixed frame to the baler, the fixed frame extending along a longitudinal front-rear axis and having a dumping frame pivotably mounted thereto for pivoting movement about a pivot axis substantially transverse to the longitudinal axis of the fixed frame;

receiving the bales on a movable bale transfer mechanism upon discharge of the bales from the baler;

moving the bale transfer mechanism from a forward bale receiving position for receiving a bale from the baler, to a rearward bale transfer position to move the bale onto the dumping frame; and pivoting the dumping frame about the dumping frame pivot axis relative to the fixed frame to a bale dumping position wherein bales on the dumping frame are discharged onto the ground.

21. A method of handling formed bales subsequent to discharge from a baler comprising the steps of:

attaching a fixed frame to the baler, the fixed frame having a dumping frame pivotably mounted thereto;

receiving the bales on a movable bale transfer mechanism upon discharge of the bales from the baler by depositing each bale upon discharge from the baler onto a bale receiver which is pivotably mounted to a movable carriage for movement between a bale receiving position and an upright position;

moving the bale transfer mechanism such that each bale is moved onto the dumping frame by moving the bale receiver to its upright position and moving the carriage away from the baler and toward the dumping frame; and pivoting the dumping frame relative to the fixed frame such that bales on the dumping frame are discharged onto the ground.

22. The method of claim 21, wherein the step of moving the carriage away from the baler and toward the dumping frame is carried out by mounting the carriage to channel structure having a forward section secured to the fixed frame and a rearward section secured to the dumping frame.

23. A bale accumulator for use in combination with a baler having a discharge, comprising:

a first frame connectable to the baler and extending along a longitudinal axis;

a dumping frame pivotably mounted to the first frame for movement about a pivot axis transverse to the longitudinal axis of the first frame, between a bale accumulating position and a bale dumping position;

a bale transfer mechanism movably mounted to the accumulator for movement between a forward bale receiving position in which the bale transfer mechanism receives a formed bale from the discharge of the balers and a rearward bale transfer position in which the bale transfer mechanism moves the bale rearwardly onto the dumping frame; and an operating device for moving the dumping frame between its bale accumulating and bale dumping positions.

\* \* \* \* \*